(12) United States Patent
Chang (10) Patent No.: US 7,948,693 B2
(45) Date of Patent: May 24, 2011

(54) APERTURE APPARATUS AND LENS MODULE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/760,529

(22) Filed: Apr. 14, 2010

(65) Prior Publication Data

US 2011/0058266 A1    Mar. 10, 2011

(30) Foreign Application Priority Data

Sep. 9, 2009   (CN) ............. 2009 1 0306767

(51) Int. Cl.
*G02B 7/02*   (2006.01)
*G02B 9/00*   (2006.01)
(52) U.S. Cl. ...................... 359/811; 359/754
(58) Field of Classification Search .......... 359/811–824, 359/642, 614, 754
See application file for complete search history.

(56) References Cited

U.S. PATENT DOCUMENTS

| 7,738,194 B2* | 6/2010 | Choi et al. .......... 359/811 |
| 7,746,451 B1* | 6/2010 | Wilson et al. .......... 356/72 |
| 2009/0153973 A1* | 6/2009 | Tsai .......... 359/614 |

* cited by examiner

*Primary Examiner* — Mohammed Hasan
(74) *Attorney, Agent, or Firm* — Raymond J. Chew (57) ABSTRACT

An exemplary aperture apparatus includes a transparent substrate, a number of EAP sheets supported by the substrate and spaced apart from each other, a first electrode, a second electrode and an aperture sheet. Each of the EAP members includes a fixed first end and an opposite second end movable relative to the substrate. The first electrode and the second electrode contact the first surface at the first end of each of the EAP members. The aperture sheet is made of black rubber and is positioned on the second surface of the EAP members. The second ends of the EAP members are fixed to inner wall of the aperture sheet. The EAP members are deformable in response to a voltage applied between the first and second electrodes so as to vary the size of the aperture.

18 Claims, 9 Drawing Sheets

APERTURE APPARATUS AND LENS MODULE HAVING SAME

BACKGROUND

1. Technical Field

The present disclosure relates to an aperture apparatuses, and particularly to an aperture apparatus with a variable aperture and a lens module having same.

2. Description of Related Art

Aperture apparatuses are key components in lens modules in cameras to control light incident to the lens modules.

A typical aperture apparatus includes an aperture sheet having a number of apertures in different sizes, and uses a complicated driving apparatus for driving the aperture sheet to move to allow a selected aperture align with the lens group in the lens module.

What is needed, therefore, is an aperture apparatus, which can overcome the above shortcomings

BRIEF DESCRIPTION OF THE DRAWINGS

Many aspects of the present aperture apparatus and lens module can be better understood with reference to the following drawings. The components in the drawings are not necessarily drawn to scale, the emphasis instead being placed upon clearly illustrating the principles of the present aperture apparatus and lens module. Moreover, in the drawings, like reference numerals designate corresponding parts throughout the several views.

DETAILED DESCRIPTION OF THE EMBODIMENTS

Embodiments of the present aperture apparatus will now be described in detail below and with reference to the drawings.

Figure 1:
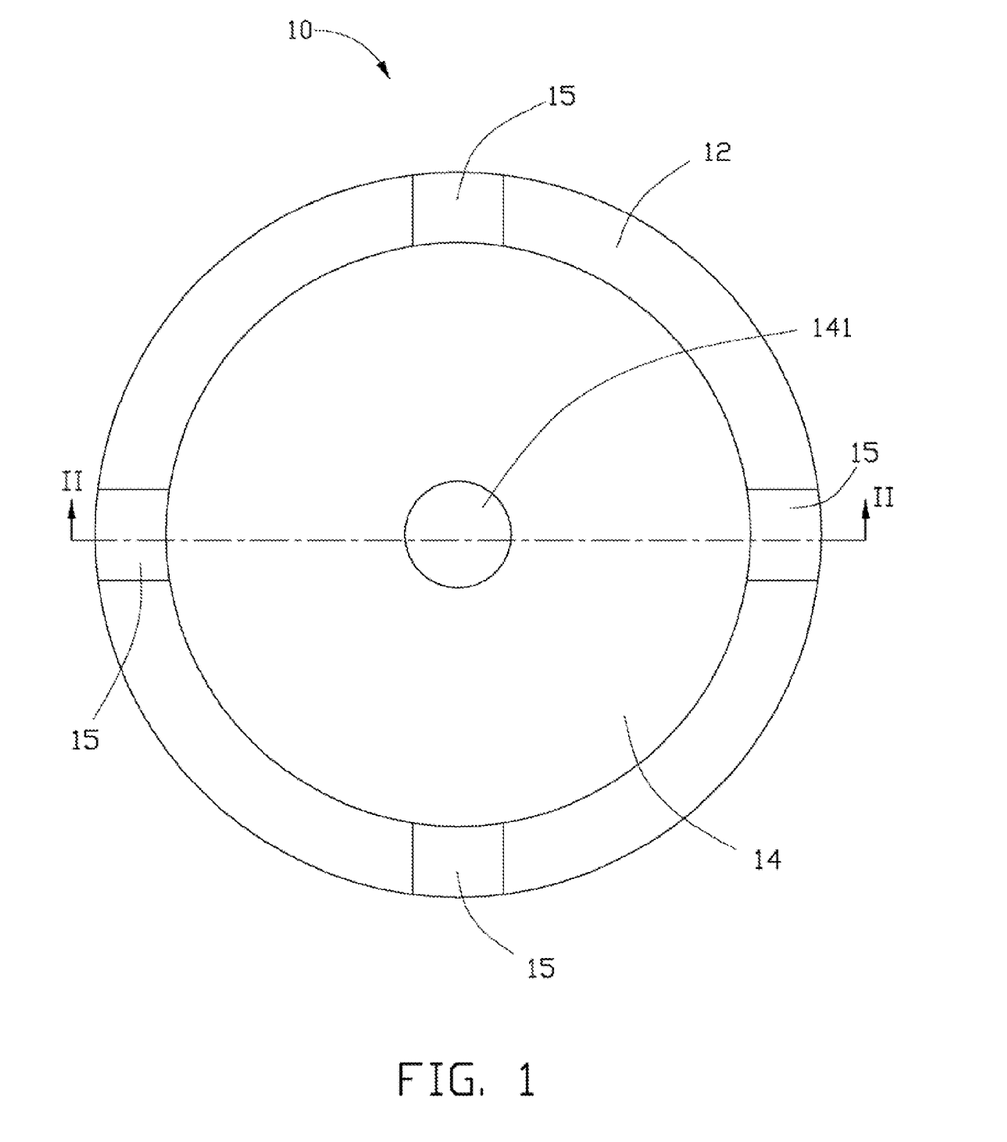
FIG. 1 is a top view of an aperture apparatus in accordance with a first embodiment.
Figure 2:
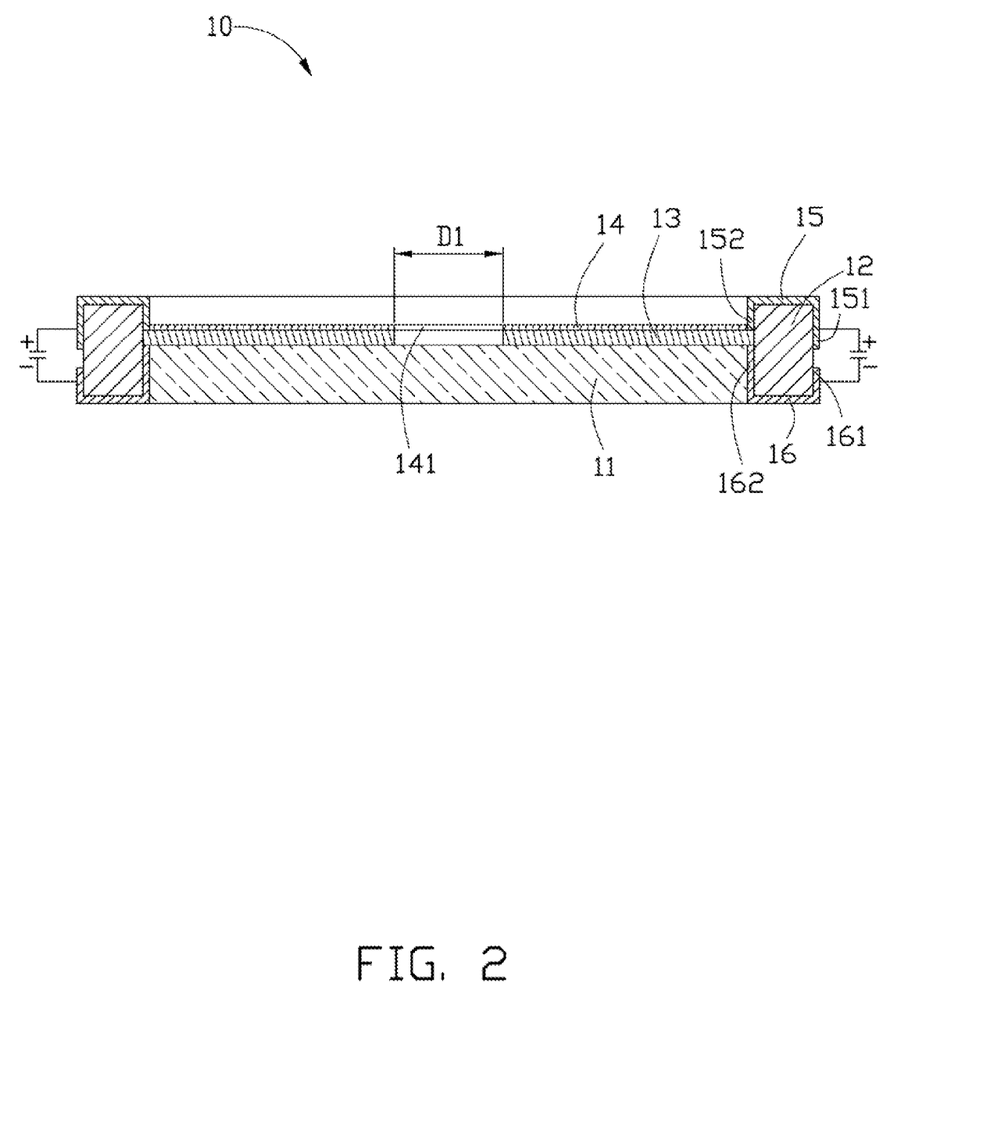
FIG. 2 is a cross sectional view of the aperture apparatus shown in FIG. 1, taken along line II-II.
Figure 3:
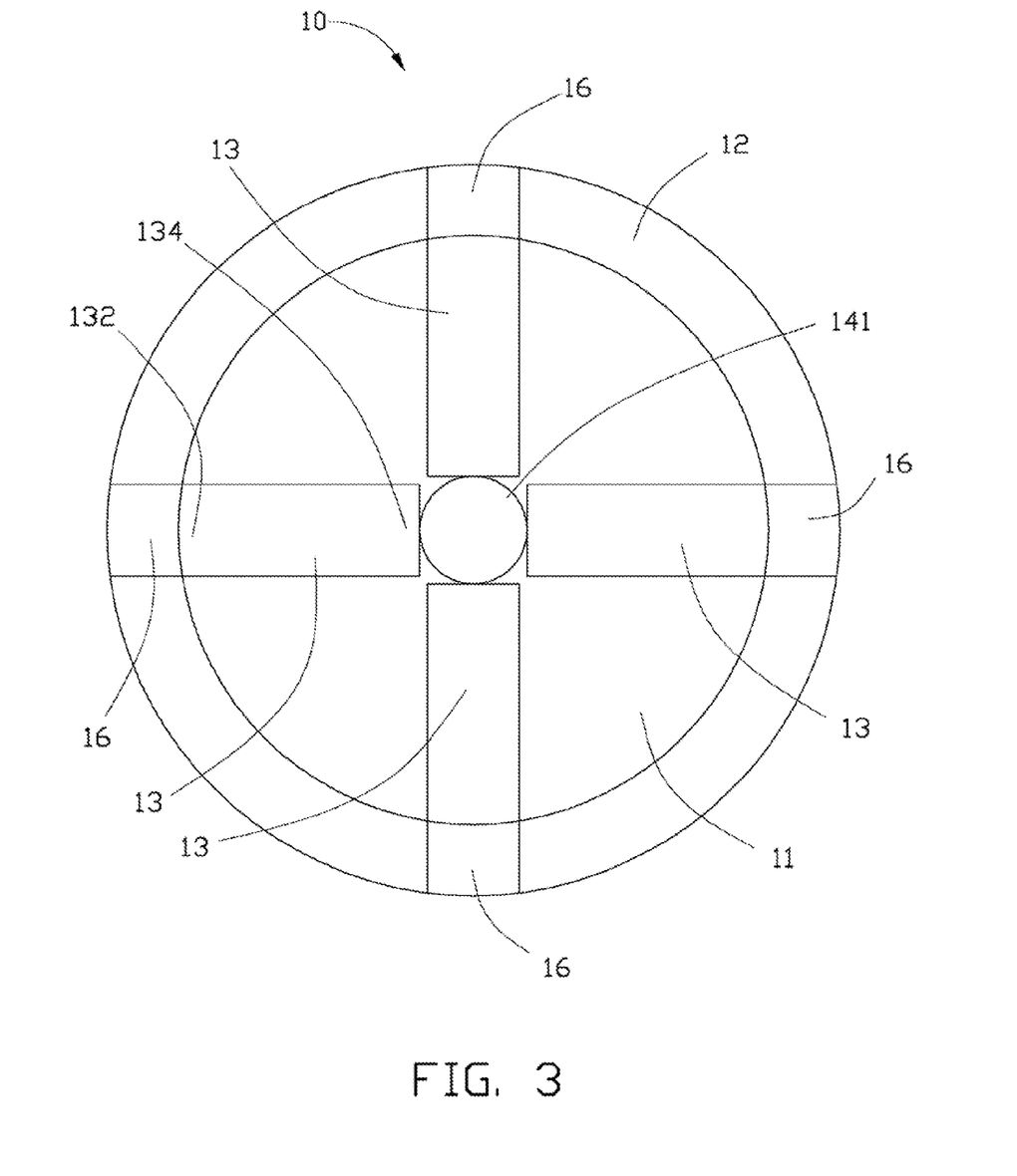
FIG. 3 is a bottom view of the aperture apparatus in accordance with the first embodiment.

Referring to FIGS. 1 to 3, an aperture apparatus 10 in accordance with a first embodiment is shown. The aperture apparatus 10 includes a ring-shaped retainer 12, a transparent substrate 11, four electro-active polymer (EAP) members 13 supported by the substrate 11, four first electrodes 15, four second electrodes 16, and an aperture sheet 14 made of black rubber supported by the EAP members 13.

The retainer 12 is made of plastic material. The retainer 12 defines a receiving space therein, the substrate 11, the EAP members 13, and the aperture sheet 14 are received in the receiving space. The substrate 11 can be made of glass, and is also ring-shaped.

The EAP members 13 are made into stripes, and are evenly spaced apart from each other. Two EAP members are arranged along a first line and the other two EAP members are arranged along a second line perpendicular to the first line. Each of the EAP members 13 includes a first surface 133 in contact with the substrate 11 and an opposite second surface 131. Each of the EAP members 13 includes a fixed first end 132 and an opposite movable second end 134.

The first electrodes 15 are fixed to a top of the retainer 12. Each of the first electrodes 15 includes a first end 151 positioned on an outer wall of the retainer 12, and a second end 152 extending into the receiving space of the retainer 12 and positioned on an inner wall of the retainer 12. The second electrodes 16 are fixed to a bottom of the retainer 12. Each of the second electrode 16 includes a first end 161 positioned on an outer wall of the retainer 12, and a second end 162 extending into the receiving space of the retainer 12 and positioned on an inner wall of the retainer 12. One of the first electrodes 15 aligns with one of the second electrodes 16. A pair of the second ends 152, 162 of the first and second electrodes 15, 16 has one of the first ends 132 of the EAP members 13 sandwiched therebetween. The second end 152 of the first electrode 15 is in contact with the second surface of the EAP sheet 13, and the second end 162 of the second electrode 16 is in contact with the first surface of the EAP sheet 13.

The aperture sheet 14 is also ring-shaped. The aperture sheet 14 includes an aperture 141 defined therein and a peripheral portion surrounding the aperture 141. The second end 134 of the EAP members 13 is fixed to inner wall portions of the peripheral portion adjacent to the aperture 141, with the second ends of the EAP members 13 terminating at an inner wall of the aperture sheet 14. In the present embodiment, outer wall portions of the peripheral portion substantially align with the first ends 132 of the EAP members 13.

Figure 4:
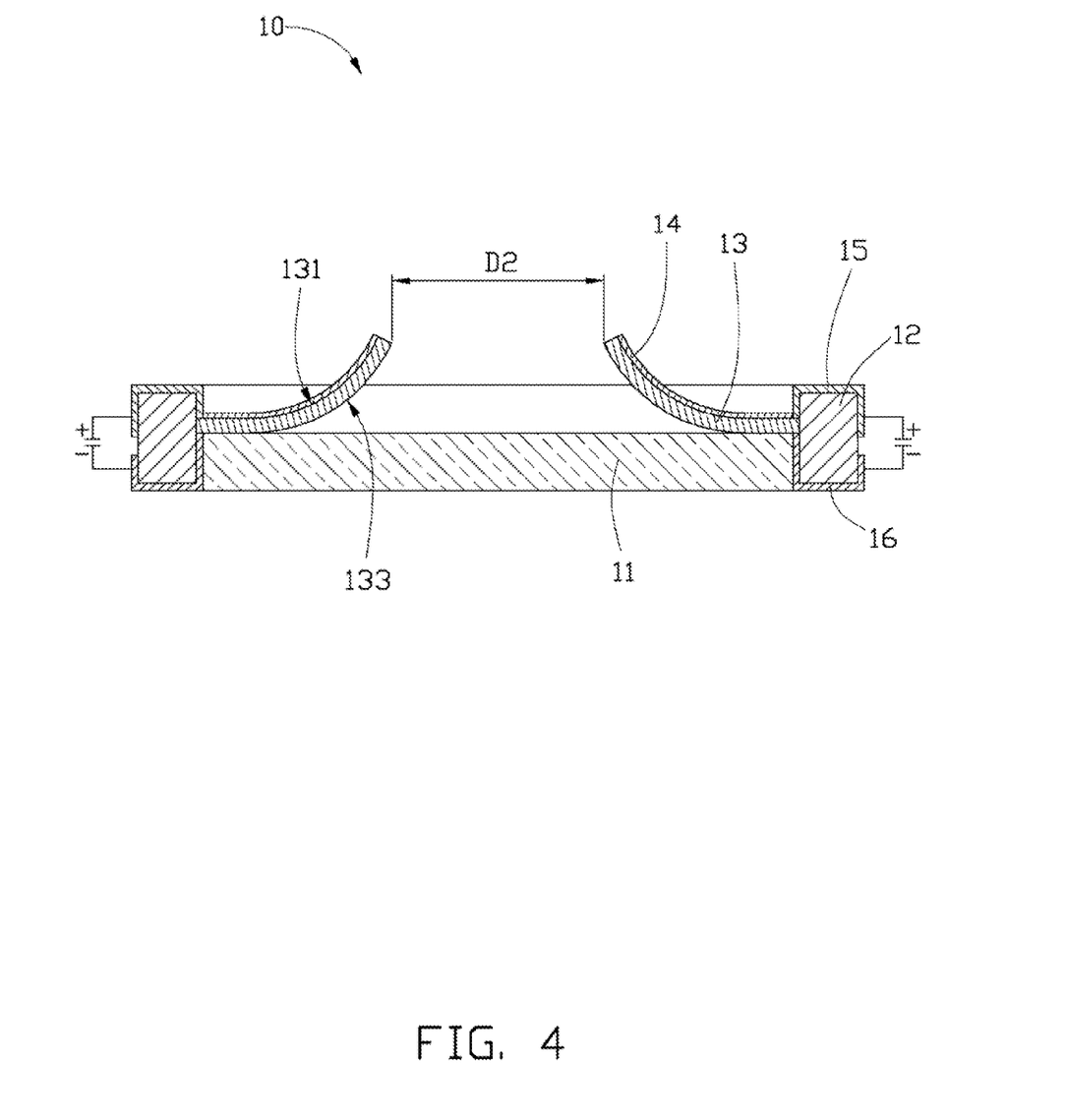
FIG. 4 is similar to FIG. 2, but showing a cross sectional view of the aperture apparatus when a voltage is applied thereon.
Figure 5:
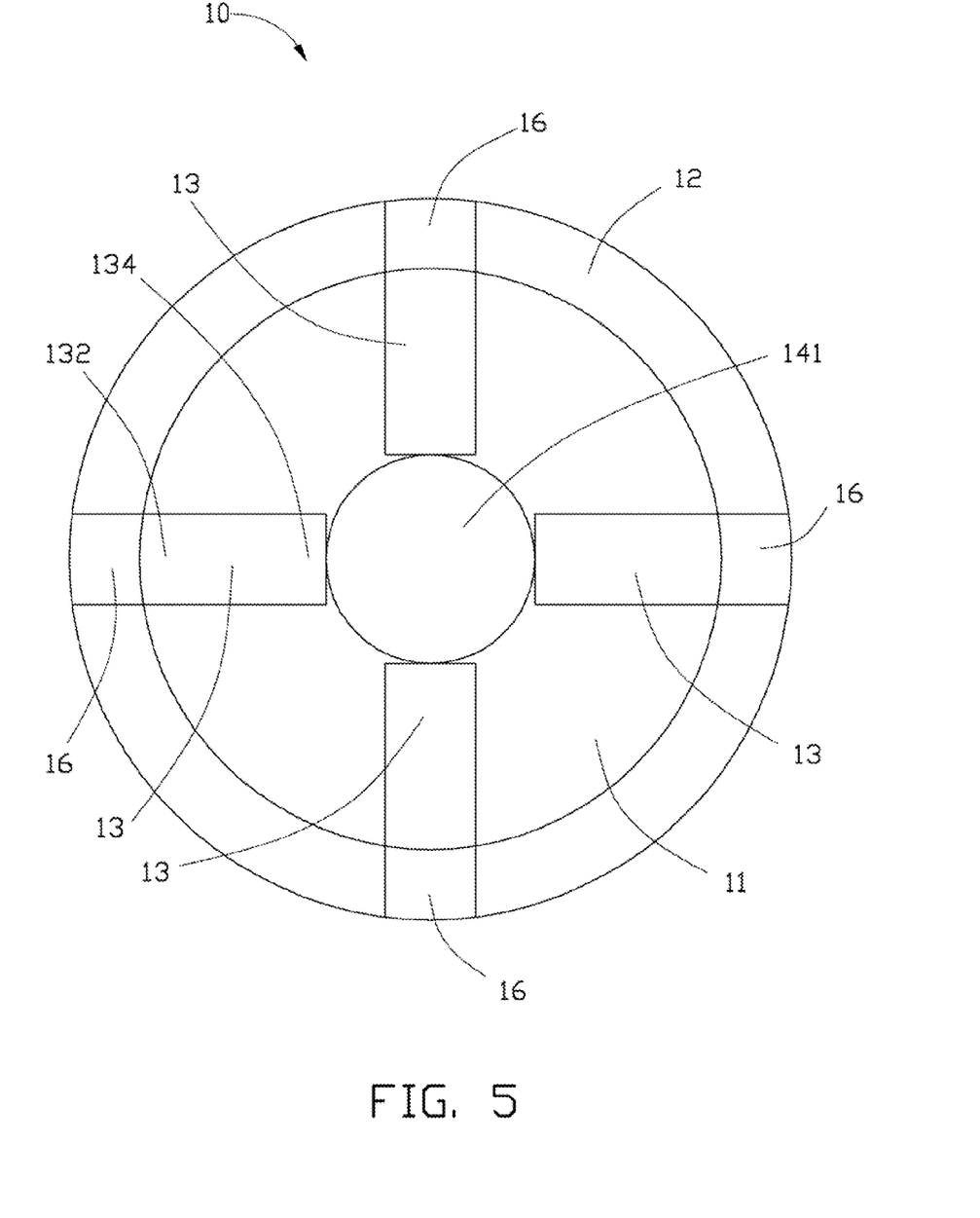
FIG. 5 is similar to FIG. 3, but showing a bottom view of the aperture apparatus when a voltage is applied thereon.

Referring to FIGS. 4 and 5, as the EAP members 13 and the aperture sheet 14 are flexible, when a voltage is applied between the first ends 151, 161 of the first and second electrodes 15, 16, the second ends 134 of the EAP members 13 together with the aperture sheet 14 bend in a direction away from the substrate 11. In this way, the size of the aperture 141 is changed from D1 to D2.

Figure 6:
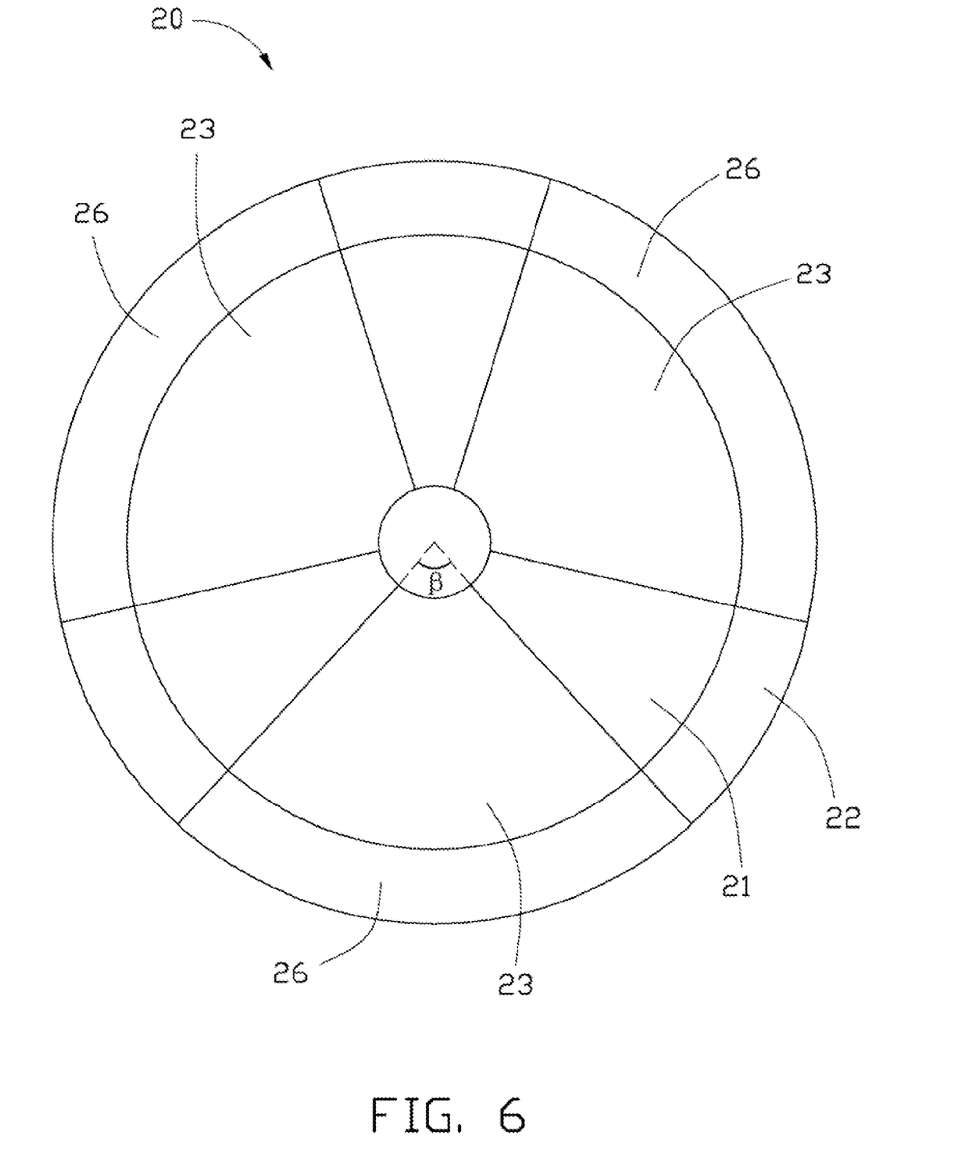
FIG. 6 is a bottom view of an aperture apparatus in accordance with a second embodiment.

FIG. 6 is similar to FIG. 3, but showing an aperture apparatus 20 in accordance with a second embodiment. The difference between the aperture apparatus 20 and the aperture apparatus 10 illustrated above is that the aperture apparatus 20 includes three spaced sector-shaped EAP members 23 in contact with a transparent substrate 21, three circular second electrode 26 and three opposite circular first electrode (not labeled) applied on a retainer 22. Preferably, a central angle β of each of the sector-shaped EAP members 23 is in a range from 30 degrees to 70 degrees.

Figure 7:
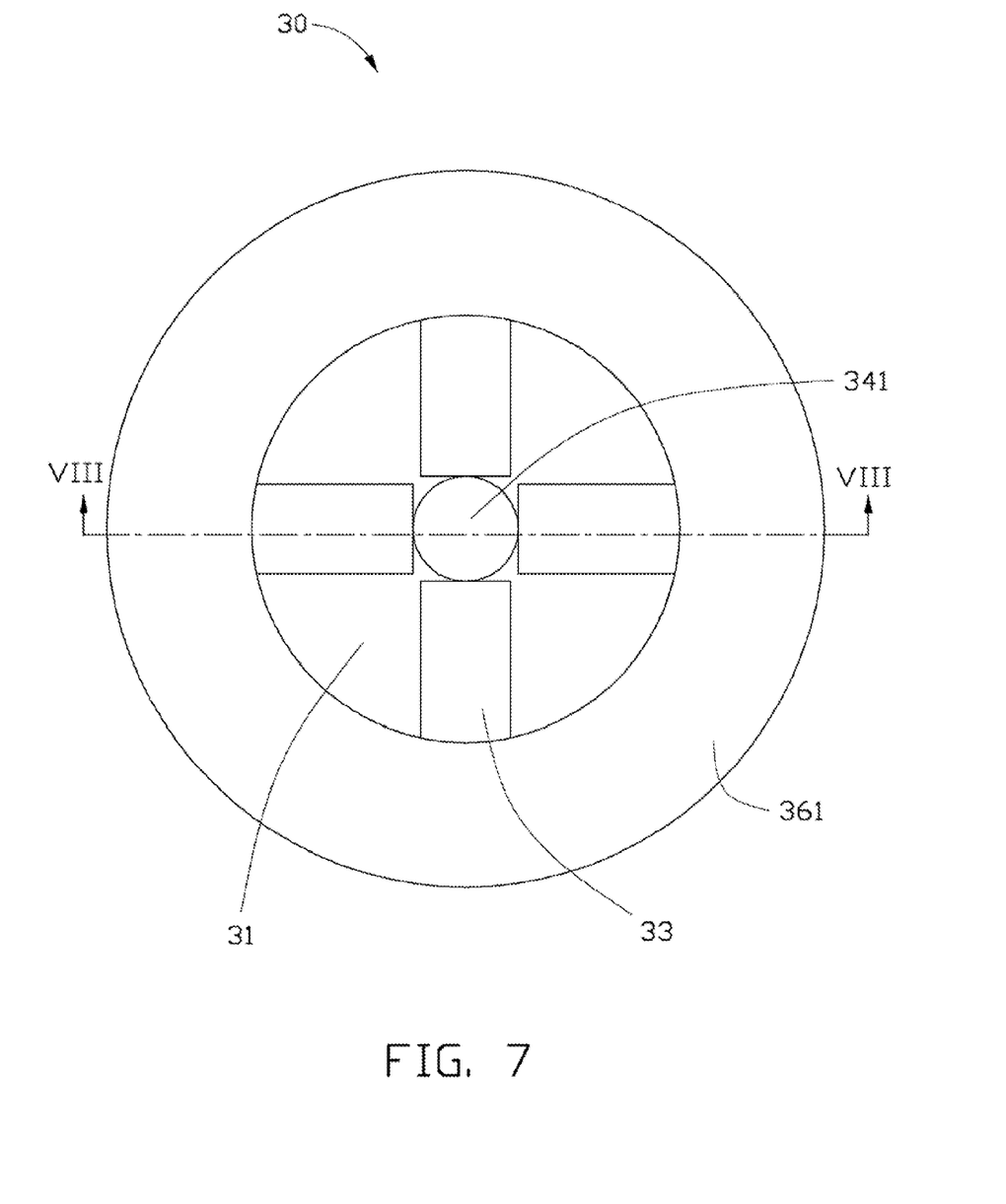
FIG. 7 is a bottom view of an aperture apparatus in accordance with a third embodiment.
Figure 8:
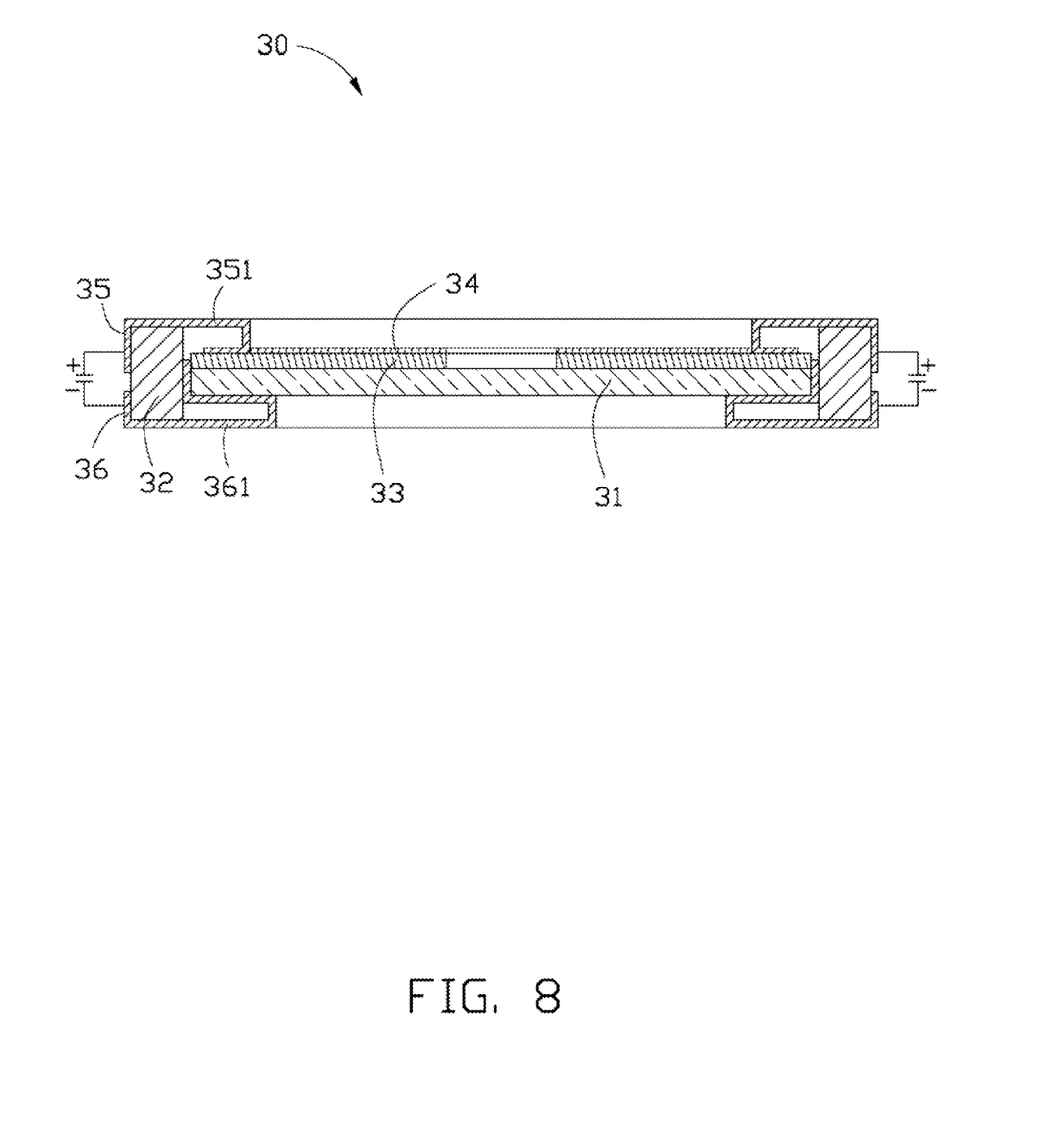
FIG. 8 is a cross sectional view of the aperture apparatus of FIG. 7, taken along line VIII-VIII.

FIGS. 7 and 8 show an aperture apparatus 30 in accordance with a third embodiment, and FIG. 7 is also similar to FIG. 3. The differences between the aperture apparatus 30 and the aperture apparatus 10 illustrated above are that the aperture apparatus 30 includes a ring-shaped second electrode 36 at the bottom and a ring-shaped first electrode 35 at the top.

The second electrode 36 includes a ring-shaped extending portion 361 extending into the receiving space of the retainer 32, and the substrate 31 sits on the extending portion 361. An end of the extending portion 361 electrically contacts the EAP members 33. The first electrode 35 also includes a ring-shaped extending portion 351 extending into the receiving space of the retainer 32 and electrically contacts the EAP members 33. A peripheral portion of the aperture sheet 34 abuts against the extending portion 351 of the first electrode 35.

Figure 9:
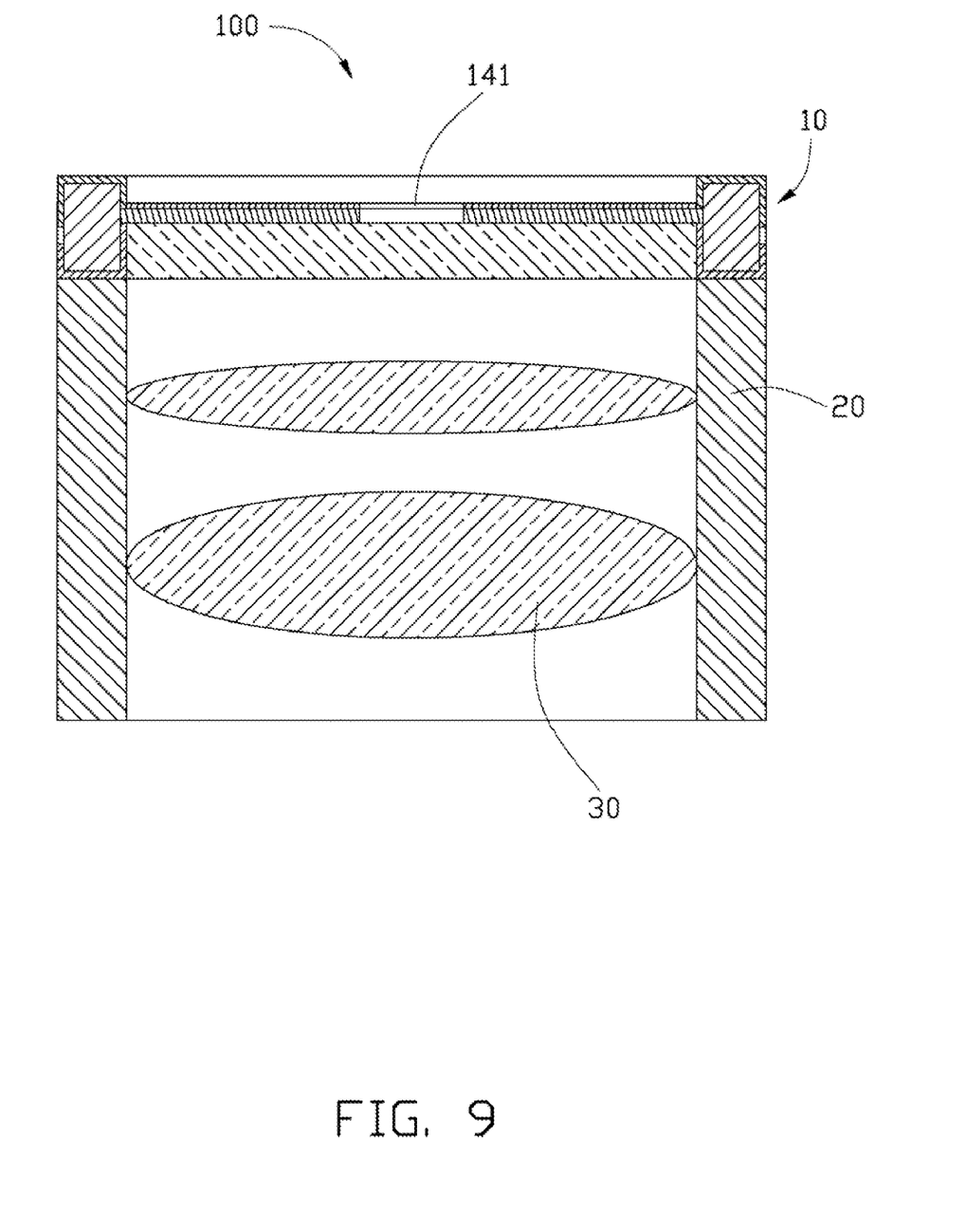
FIG. 9 is a cross sectional view of a lens module in accordance with a fourth embodiment, the lens module having an aperture apparatus mounted thereon.

FIG. 9 shows a lens module 100 in accordance with a fourth embodiment. The lens module 100 includes lens-holder 20, a lens group 30 received in the lens-holder 20, and an aperture apparatus 10 mounted at an end of the lens-holder 20. The size of the aperture 141 of the aperture apparatus 10 can be varied when different voltages are applied on the aperture apparatus 10.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An aperture apparatus, comprising:
a transparent substrate;
a plurality of elongated electro-active polymer (EAP) members supported by the substrate and spaced apart from each other, each of the EAP members comprising a first surface facing the transparent substrate and an opposite second surface, each of the EAP members further comprising a fixed first end and an opposite second end movable relative to the substrate;
a first electrode and a second electrode respectively contacting the second surface and the first surface at the first end of each of the EAP members; and
an aperture sheet made of black rubber and positioned on the EAP members, the aperture sheet comprising an aperture defined therein and a peripheral portion surrounding the aperture, the EAP members being under the peripheral portion and arranged around the aperture, the first ends of the EAP members being substantially aligned with outer wall portions of the peripheral portion, the second ends of the EAP members being fixed to inner wall portions of the peripheral portion adjacent to the aperture, the EAP members being deformable in response to a voltage applied between the first and second electrodes so as to vary the size of the aperture.

2. The aperture apparatus as described in claim 1, wherein the plurality of EAP members comprise four EAP members with two EAP members arranged along a first line and the other two EAP members arranged along a second line perpendicular to the first line.

3. The aperture apparatus as described in claim 2, wherein the EAP members are strip-shaped.

4. The aperture apparatus as described in claim 1, wherein the plurality of EAP members comprises three sector-shaped EAP members.

5. The aperture apparatus as described in claim 1, further comprising a ring-shaped retainer, the substrate, the EAP members and the aperture sheet located within the retainer, the first electrode fixed to a top of the retainer and the second electrode fixed to a bottom of the retainer.

6. The aperture apparatus as described in claim 5, wherein the retainer is made from plastic material.

7. The aperture apparatus as described in claim 5, wherein each of the first and second electrodes is ring-shaped, the second electrode comprises a ring-shaped extending portion, and the substrate sits on the extending portion.

8. An aperture apparatus, comprising:
a hollow retainer defining a receiving space therein, the retainer comprising a top and a bottom;
a plurality of first electrodes fixed to the top of the retainer, each of the first electrodes comprising a first extending portion extending into the receiving space;
a plurality of second electrodes fixed to the bottom of the retainer, each of the second electrodes comprising a second extending portion extending into the receiving space;
a transparent substrate located between the first extending portions and the second extending portions;
a plurality of electro-active polymer (EAP) members supported by the substrate and spaced apart from each other, each of the EAP members comprising a first surface facing the substrate and an opposite second surface, each of the EAP members comprising a fixed first end and an opposite second end movable relative to the substrate, the first and second extending portions in contact with the first ends;
an elastic aperture sheet positioned on the second surface of the EAP members, the aperture sheet comprising an aperture defined therein and a peripheral portion surrounding the aperture, the EAP members being under the peripheral portion and arranged around the aperture, the first ends of the EAP members being substantially aligned with outer wall portions of the peripheral portion, the second ends of the EAP members being fixed to inner wall portions of the peripheral portion adjacent to the aperture, the EAP members being deformable in response to a voltage applied between the first and second electrodes so as to vary the size of the aperture.

9. The aperture apparatus as described in claim 8, wherein the second ends of the EAP members terminate at an inner wall of the aperture sheet.

10. The aperture apparatus as described in claim 8, wherein the EAP members are strip-shaped.

11. The aperture apparatus as described in claim 8, wherein the plurality of EAP members comprises three sector-shaped EAP members.

12. The aperture apparatus as described in claim 8, wherein the retainer is ring-shaped, the substrate, the EAP members and the aperture sheet are located within the retainer, the first electrode is fixed to a top of the retainer, and the second electrode is fixed to a bottom of the retainer.

13. The aperture apparatus as described in claim 12, wherein each of the first and second electrodes is ring-shaped, the second electrode comprises a ring-shaped extending portion, and the substrate sits on the extending portion.

14. A lens module comprising:
a lens group;
a lens-holder receiving the lens group therein, the lens-holder comprising an end; and
an aperture apparatus mounted at the end, the aperture apparatus comprising:
a transparent substrate;
a plurality of electro-active polymer (EAP) members supported by the substrate and spaced apart from each other, each of the EAP members comprising a fixed first end and an opposite second end movable relative to the substrate;
a first electrode and a second electrode both contacting the first end of each of the EAP members; and
an elastic aperture sheet positioned on the EAP members, the aperture sheet comprising an aperture defined therein and a peripheral portion surrounding the aperture, the EAP members being under the peripheral portion and arranged around the aperture, the first ends of the EAP members being substantially aligned with outer wall portions of the peripheral portion, the second ends of the EAP members being fixed to inner wall portions of the peripheral portion adjacent to the aperture, the EAP members being deformable in response to a voltage applied between the first and second electrodes so as to vary the size of the aperture.

15. The lens module as described in claim 14, wherein the EAP members are strip-shaped.

16. The lens module as described in claim 14, wherein the plurality of EAP members comprises three sector-shaped EAP members.

17. The lens module as described in claim 14, wherein the aperture apparatus further comprises a ring-shaped retainer, the substrate, the EAP members and the aperture sheet are located within the retainer, the first electrode is fixed to a top of the retainer, and the second electrode is fixed to a bottom of the retainer.

18. The lens module as described in claim 17, wherein each of the first and second electrodes is ring-shaped, the second electrode comprises a ring-shaped extending portion, and the substrate sits on the extending portion.

* * * * *